United States Patent Office 3,729,486
Patented Apr. 24, 1973

3,729,486
EPITHIO DI-UNSATURATED ALIPHATIC
KETONES AND ALDEHYDES
John B. Siddall and Clive A. Henrick, Palo Alto, Calif.,
assignors to Zoecon Corporation, Palo Alto, Calif.
No Drawing. Filed Feb. 1, 1971, Ser. No. 111,650
Int. Cl. C07d 59/00, 1/00
U.S. Cl. 260—327 E                    10 Claims

ABSTRACT OF THE DISCLOSURE

Di-unsaturated aliphatic ketones and aldehydes substituted with oxido, epithio, hydroxy and ethers and esters thereof, or halogen useful for the control of insects.

This invention relates to substituted di-unsaturated aliphatic ketones and aldehydes of the following Formula A:

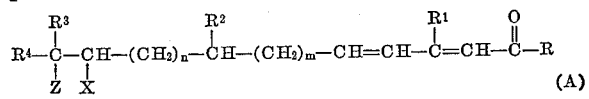

(A)

wherein,

R is hydrogen, alkyl, cycloalkyl, aryl or aralkyl;
$R^1$ is hydrogen or alkyl;
each of $R^2$, $R^3$ and $R^4$ is alkyl;
m is zero or the positive integer one, two or three;
n is the positive integer one, two or three;
X is hydrogen, bromo, chloro or fluoro;
Z is —$OR^5$, bromo, chloro, fluoro, or, taken together with X, oxido or epithio; and
$R^5$ is hydrogen, carboxylic acyl, alkyl, cycloalkyl or aralkyl, provided that when X is bromo, chloro or fluoro, then Z is bromo, chloro or fluoro.

The compounds of Formula A are useful for the control of insects. The compounds are applied using either liquid or solid carriers, such as water, acetone, cottonseed oil, xylene, mineral oil, silicon, talc, natural and synthetic resins, and the like. Generally, compositions for application will contain up to about 75% of the active compound and more usually less than 25%, sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; and Coleoptera, such as Tenebrionidae, Crysomelidae and Dermestidae. For example, *Pyrrhocoris apterus, Lygus hesperus, Tenebrio molitor, Triboleum confusm, Diabrotica duodecimpunctata, Dermestes maculatus, Aedes aegypti* and *Musca domestica*. Without any intention of being bound by theory, the compounds of Formula A are believed to be effective by reason of hormonal action in that unlike conventional insecticides which are effective by reason of causing immediate death, the compounds of Formula A are effective by reason of physiological changes caused in the treated insect which result in eventual death of the insect and/or inability of the treated insect to reproduce by reason of sterility or abnormal development.

In the description hereinafter, each of R through $R^5$, m, n, X and Z are as defined above.

The compounds of Formula A, wherein Z is bromo, chloro or fluoro and X is hydrogen, are prepared by treating a compound of Formula B with one equivalent of hydrogen halide in carbon tetrachloride or other halogenated hydrocarbon solvent of low dielectric constant. The compounds of Formula A, wherein both Z and X is bromo, chloro or fluoro, are prepared by treating a compound of Formula B with one equivalent of bromine, chlorine or fluorine in a halogenated hydrocarbon solvent.

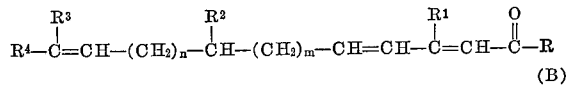

(B)

A compound of Formula B is converted into a compound of Formula A wherein Z is —$OR^5$ in which $R^5$ is hydrogen by the addition of water to the terminal olefinic bond using a mercuric salt followed by reduction of the oxymercurial intermediate in situ. Suitable mercuric salts include mercuric acetate, mercuric nitrate, mercuric trifluoroacetate, mercuric acylates and mercuric halides. Suitable reducing agents include the borohydrides, hydrazine and sodium amalgam. See Brown and Rei, J. Am. Chem. Soc. 91, 5646 (1969); Brown et al., J. Am. Chem. Soc. 89, 1522 and 1524 (1967); and Wakabayashi, J. Med. Chem. 12, 191 (January, 1969). By conducting the reaction in the presence of an alcohol (R—OH) such as methanol, ethanol, isopropyl alcohol, benzyl alcohol, cyclopentanol, and the like, the corresponding ether is prepared. The compound of Formula A wherein R is carboxylic acyl are prepared from a compound of Formula A wherein R is hydrogen by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

A tri-unsaturated compound of Formula B is reacted with an organic peracid, such as perphthalic acid or perbenzoic acid in an organic solvent, such as ether, to yield an epoxide (Z taken together with X is oxido) of Formula A. The epoxide (A) can be purified by washing the reaction mixture with a dilute aqueous solution of an alkali hydroxide or carbonate or bicarbonate to remove the acid formed from the peracid used. The epoxide ring is considerably sensitive to acid media and, therefore, acid should be removed. The final purification can be performed by chromatography.

The episulfides (Z taken together with X is epithio) are prepared by reaction of an epoxide of Formula A with potassium thiocyanate or ammonium thiocyanate in an organic solvent, such as a lower alcohol. The reaction is usually done above room temperature to reflux temperature of the reaction mixture.

The ketones of Formula B are prepared by reacting organolithium with an acid of Formula C. The aldehydes of Formula B are prepared by mild oxidation of an allylic alcohol of Formula D. The preparation of the compounds of Formulas B, C and D is described in our copending applications Ser. No. 111,766, filed on evendate herewith, entitled "Novel Compositions" and Ser. No. 111,765, filed on evendate herewith, entitled "Insect Control," the disclosure of each is incorporated herein by reference, each now abandoned.

The term "carboxylic acyl," as used herein, refers to the acyl group of carboxylic acid, anhydride or halide. The acyl group is determined by the particular carboxylic acid halide or carboxylic acid anhydride employed in the esterification of a compound of Formula A wherein R is hydrogen. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl of seven to twelve carbon atoms. The term "aryl," as used herein, refers to an aryl group of six to twelve carbon atoms, such as phenyl, methylphenyl, naphthyl, and the like.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. Whenever the term "alkyl" is modified by the word "lower," the chain length of the group is not more than six carbon atoms.

The following examples are provides to illustrate the practice of the present invention. Temperature is given in degrees centigrade.

EXAMPLE 1

To a mixture of 24 g. of 5,9,13-trimethyltetradeca-4,6,12-trien-3-one in 75 ml. of ether, cooled in an ice-bath, is slowly added 0.1 mole of perphthalic acid in ether. Then the reaction mixture is allowed to stand for about 30 minutes. The mixture, at room temperature, is shaken with dilute aqueous sodium hydroxide and then separated. The organic phase is washed with water, dried over magnesium sulfate and evaporated under reduced pressure to yield 12,13 - oxido - 5,9,13 - trimethyltetradeca-4,6-dien-3-one which is purified by chromatography on neutral silica gel.

The above process is repeated using each of the unsaturated ketones under Column I to prepare the respective epoxide under Column II.

I 5,9,13-trimethylpentadeca-4,6,12-trien-3-one,
5,13-dimethyl-9-ethylpentadeca-4,6,12-trien-3-one,
9,13-diethyl-5-methylpentadeca-4,6,12-trien-3-one,
5,10,14-trimethylpentadeca-4,6,13-trien-3-one,
5,9,12-trimethyltrideca-4,6,11-trien-3-one,
5,9,12-trimethyltetradeca-4,6,11-trien-3-one,
5,8,12-trimethyltrideca-4,6,11-trien-3-one,
9,13-dimethyltetradeca-4,6,12-trien-3-one,
9,13-dimethylpentadeca-4,6,12-triene-3-one,
9-ethyl-13-methylpentadeca-4,6,12-trien-3-one,
9,13-diethylpentadeca-4,6,12-trien-3-one,
10,14-dimethylpentadeca-4,6,13-trien-3-one,
9,12-dimethyltrideca-4,6,11-trien-3-one,
9,12-dimethyltetradeca-4,6,11-trien-3-one, and
8,12-dimethyltrideca-4,6,11-trien-3-one.

II 12,13-epoxide of 5,9,13-trimethylpentadeca-4,6,12-trien-3-one,
5,13-dimethyl-9-ethylpentadeca-4,6,12-trien-3-one, and
9,13-diethyl-5-methylpentadeca-4,6,12-trien-3-one;
13,14-epoxide of 5,10,14-trimethylpentadeca-4,6,13-trien-3-one;
11,12-epoxide of 5,9,12-trimethyltrideca-4,6,11-trien-3-one,
5,9,12-trimethyltetradeca-4,6,11-trien-3-one, and
5,8,12-trimethyltrideca-4,6,11-trien-3-one;
12,13-epoxide of 9,13-dimethyltetradeca-4,6,12-trien-3-one,
9,13-dimethylpentadeca-4,6,12-trien-3-one,
9-ethyl-13-methylpentadeca-4,6,12-trien-3-one, and
9,13-diethylpentadeca-4,6,12-trien-3-one;
13,14-epoxide of 10,14-dimethylpentadeca-4,6,13-trien-3-one; and
11,12-epoxide of 9,12-dimethyltrideca-4,6,11-trien-3-one,
9,12-dimethyltetradeca-4,6,11-trien-3-one, and
8,12-dimethyltrideca-4,6,11-trien-3-one.

Each of the methyl ketones under Column III is epoxidized with peracid to prepare the respective epoxide under Column IV.

III 4,8,12-trimethyltetradeca-3,5,11-trien-2-one,
4,12-dimethyl-8-ethyltetradeca-3,5,11-trien-2-one,
8,12-diethyl-4-methyltetradeca-3,5,11-trien-2-one,
4,9,13-trimethyltetradeca-3,5,12-trien-2-one,
4,8,11-trimethyldodeca-3,5,10-trien-2-one,
4,8,11-trimethyltrideca-3,5,10-trien-2-one,
4,7,11-trimethyldodeca-3,5,10-trien-2-one,
8,12-dimethyltrideca-3,5,11-trien-2-one,
8,12-dimethyltetradeca-3,5,11-trien-2-one,
8-ethyl-12-methyltetradeca-3,5,11-trien-2-one,
8,12-diethyltetradeca-3,5,11-trien-2-one,
9,13-dimethyltetradeca-3,5,12-trien-2-one,
8,11-dimethyldodeca-3,5,10-trien-2-one,
8,11-dimethyltrideca-3,5,10-trien-2-one, and
7,11-dimethyldodeca-3,5,10-trien-2-one.

IV 11,12-epoxide of 4,8,12-trimethyltetradeca-3,5,11-trien-2-one,
4,12-dimethyl-8-ethyltetradeca-3,5,11-trien-2-one, and
8,12-diethyl-4-methyltetradeca-3,5,11-trien-2-one;
12,13-epoxide of 4,9,13-trimethyltetradeca-3,5,12-trien-2-one;
10,11-epoxide of 4,8,11-trimethyldodeca-3,5,10-trien-2-one,
4,8,11-trimethyltrideca-3,5,10-trien-2-one, and
4,7,11-trimethyldodeca-3,5,10-trien-2-one;
11,12-epoxide of 8,12-dimethyltrideca-3,5,11-trien-2-one,
8,12-dimethyltetradeca-3,5,11-trien-2-one,
8-ethyl-12-methyltetradeca-3,5,11-trien-2-one, and
8,12-diethyltetradeca-3,5,11-trien-2-one;
12,13-epoxide of 9,13-dimethyltetradeca-3,5,12-trien-2-one; and
10,11-epoxide of 8,11-dimethyldodeca-3,5,10-trien-2-one,
8,11-dimethyltrideca-3,5,10-trien-2-one, and
7,11-dimethyldodeca-3,5,10-trien-2-one.

EXAMPLE 2

To a mixture of 2 g. of 4,8,12-trimethyltrideca-3,5,11-trien-2-one in 150 ml. of methylene chloride at 0° is slowly added 1.0 molar equivalent of m-chloroperbenzoic acid in 100 ml. of methylene chloride. The resulting mixture is allowed to stand for 30 minutes at 0° and then washed with 2% aqueous sodium sulfite solution, with 5% aqueous sodium bicarbonate solution and with water, dried over sodium sulfate and evaporated to yield 11,12-oxido-4,8,12-trimethyltrideca-3,5-dien-2-one which is purified by chromatography.

EXAMPLE 3

Each of the tri-unsaturated sodium sulfite under Column V is epoxidized using the procedure of either Example 1 or 2 to prepare the respective epoxide under Column VI.

V 3,7,11-trimethyldodeca-2,4,10-trien-1-al,
3,7,11-trimethyltrideca-2,4,10-trien-1-al, 3,11-dimethyl-7-ethyltrideca-2,4,10-trien-1-al,
7,11-diethyl-3-methyltrideca-2,4,10-trien-1-al,
3,8,12-trimethyltrideca-2,4,11-trien-1-al,
3,7,10-trimethylundeca-2,4,9-trien-1-al,
3,7,10-trimethyldodeca-2,4,9-trien-1-al,
3,6,10-trimethylundeca-2,4,9-trien-1-al,
7,11-dimethyldodeca-2,4,10-trien-1-al,
7,11-dimethyltrideca-2,4,10-trien-1-al,
7-ethyl-11-methyltrideca-2,4,10-trien-1-al,
7,11-diethyltrideca-2,4,10-trien-1-al,
8,12-dimethyltrideca-2,4,11-trien-1-al,
7,10-dimethylundeca-2,4,9-trien-1-al,
7,10-dimethyldodeca-2,4,9-trien-1-al, and
6,10-dimethylundeca-2,4,9-trien-1-al.

VI 10,11-epoxide of 3,7,11-trimethyldodeca-2,4,10-trien-1-al,
3,7,11-trimethyltrideca-2,4,10-trien-1-al,
3,11-dimethyl-7-ethyltrideca-2,4,10-trien-1-al, and
7,11-diethyl-3-methyltrideca-2,4,10-trien-1-al;
11,12-epoxide of 3,8,12-trimethyltrideca-2,4,11-trien-1-al;
9,10-epoxide of 3,7,10-trimethylundeca-2,4,9-trien-1-al,
3,7,10-trimethyldodeca-2,4,9-trien-1-al, and
3,6,10-trimethylundeca-2,4,9-trien-1-al;
10,11-epoxide of 7,11-dimethyldodeca-2,4,10-trien-1-al,
7,11-dimethyltrideca-2,4,10-trien-1-al,
7-ethyl-11-methyltrideca-2,4,10-trien-1-al, and
7,11-diethyltrideca-2,4,10-trien-1-al;
11,12-epoxide of 8,12-dimethyltrideca-2,4,11-trien-1-al; and
9,10-epoxide of 7,10-dimethylundeca-2,4,9-trien-1-al,
7,10-dimethyldodeca-2,4,9-trien-1-al, and
6,10-dimethylundeca-2,4,9-trien-1-al.

Each of cyclopentyl 2,6,10-trimethylundeca-1,3,9-trienyl ketone, phenyl 2,6,10-trimethylundeca-1,3,9-trienyl ketone and benzyl 2,6,10-trimethylundeca-1,3,9-trienyl ketone is epoxidized using the procedure of Example 1 or 2 to prepare the respective 9,10-epoxides.

EXAMPLE 4

To 0.60 g. of 12,13-oxido-5,9,13-trimethyltetradeca-4,6-dien-3-one in 25 ml. of absolute ethanol is added 5 ml. of water and 1.0 g. of potassium thiocyanate. The mixture is heated at reflux for about 65 hours. Refluxing is stopped and the mixture poured into brine and extracted with ether. The ethereal extract is washed with brine, dried and evaporated to yield 12,13-epithio-5,9,13-trimethyltetradeca-4,6-dien-3-one which can be puried by thin layer chromatography or distillation under vacuum.

The process of this example is applicable for the preparation of episulfides using any of the epoxides herein, such as those of Examples 1, 2 and 3. Each of 12,13-epithio-5,9,13-trimethylpentadeca-4,6-dien-3-one, 12,13-epithio-5,13-dimethyl-9-ethylpentadeca-4,6-dien-3-one, 11,12-epithio-4,8,12-trimethyltetradeca-3,5-dien-2-one, 11,12-epithio-4,8,12-trimethyltrideca-3,5-dien-2-one, 11,12-epithio-4,12-dimethyl-8-ethyltetradeca-3,5-dien-2-one, 10,11-epithio-3,7,11-trimethyldodeca-2,4-dien-1-al, 10,11-epithio-3,7,11-trimethyltrideca-2,4-dien-1-al and 10,11-epithio-3,11-dimethyl-7-ethyltrideca-2,4-dien-1-al is prepared from the respective epoxide.

EXAMPLE 5

To a mixture of 1.9 g. of mercuric acetate, 6 ml. of water and 20 ml. of tetrahydrofuran is added 1.49 g. of 5,9,13-trimethyltetradeca-4,6,12-trien-3-one slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica to yield 13-hydroxy-5,9,13-trimethyltetradeca-4,6-dien-3-one.

The above process is repeated using each of the compounds under Column VII as the starting material to prepare the respective hydroxyl substituted compound under Column VIII.

VII 5,9,13-trimethylpentadeca-4,6,12-trien-3-one,
5,13-dimethyl-9-ethylpentadeca-4,6,12-trien-3-one,
4,8,12-trimethyltetradeca-3,5,11-trien-2-one,
4,8,12-trimethyltrideca-3,5,11-trien-2-one,
4,12-dimethyl-8-ethyltetradeca-3,5,11-trien-2-one,
3,7,11-trimethyldodeca-2,4,10-trien-1-al,
3,7,11-trimethyltrideca-2,4,10-trien-1-al, and
3,11-dimethyl-7-ethyltrideca-2,4,10-trien-1-al.

VIII 13-hydroxy-5,19,13-trimethylpentadeca-4,6-dien-3-one,
13-hydroxy-5,13-dimethyl-9-ethylpentadeca-4,6-dien-3-one,
12-hydroxy-4,8,12-trimethyltetradeca-3,5-dien-2-one,
12-hydroxy-4,8,12-trimethyltrideca-3,5-dien-2-one,
12-hydroxy-4,12-dimethyl-8-ethyltetradeca-3,5-dien-2-one,
11-hydroxy-3,7,11-trimethyldodeca-2,4-dien-1-al,
11-hydroxy-3,7,11-trimethyltrideca-2,4-dien-1-al, and
11-hydroxy-3,11-dimethyl-7-ethyltrideca-2,4-dien-1-al.

Other hydroxy substituted di-unsaturated ketones and aldehydes of Formula A can be prepared by the process of this example using a compound of Formula B as the precursor, such as those under Columns I, III and V.

EXAMPLE 6

To a solution of 2 g. of 5,9,13 - trimethyltetradeca-4,6,12-trien-3-one in 20 ml. of ethanol, cooled to 0° by an ice bath, is added a suspension of 2.32 g. of mercuric acetate in 50 ml. of ethanol over 15 minutes. The reaction mixture is stirred for two hours and then, with cooling, to —20°, 1.22 g. of potassium hydroxide in 20 ml. of ethanol is added. Then 0.139 g. of sodium borohydride is added in small portions and stirring continued for 30 minutes at —20°. The solution is decanted, than concentrated to half volume, diluted with 100 ml. of water and extracted with ether (3×50). The ethereal phase is washed with water, dried over magnesium sulfate and the crude product chromatographed on silica to yield 13-ethoxy-5,9,13-trimethyltetradeca-4,6-dien-3-one.

The process of this example is repeated using each of the compounds under Column VII as the starting material to prepare the respective 11-ethoxy-substituted compound under the Column IX.

IX 13-ethoxy-5,9,13-trimethylpentadeca-4,6-dien-3-one,
13-ethoxy-5,13-dimethyl-9-ethylpentadeca-4,6-dien-3-one,
12-ethoxy-4,8,12-trimethyltetradeca-3,5-dien-2-one,
12-ethoxy-4,8,12-trimethyltrideca-3,5-dien-2-one,
12-ethoxy-4,12-dimethyl-8-ethyltetradeca-3,5-dien-2-one,
11-ethoxy-3,7,11-trimethyldodeca-2,4-dien-1-al,
11-ethoxy-3,7,11-trimethyltrideca-2,4-dien-1-al, and
11-ethoxy-3,11-dimethyl-7-ethyltrideca-2,4-dien-1-al.

Other hydroxy substituted di-unsaturated ketones and aldehydes of Formula A can be prepared by the process of this example using a compound of Formula B as the precursor, such as those under Columns I, III and V.

By repeating the procedure of this example using other alcohols in place of ethanol, such as methanol, isopropanol, n-butanol, cyclopentyl alcohol or benzyl alcohol, the respective ethers are obtained, that is 13-methoxy-5,9,13-trimethyltetradeca-4,6-dien-3-one,
13-isopropoxy-5,9,13-trimethyltetradeca-4,6-diene-3-one, 13-n-butoxy-5,9,13-trimethyltetradeca-4,6-dien-3-one,
13-cyclopentyloxy-5,9,13-trimethyltetradeca-4,6-dien-3-one,
13-benzyloxy-5,9,13-trimethyltetradeca-4,6-dien-3-one,
etc.

EXAMPLE 7

A mixture of 20 ml. of dry formic acid and 2 g. of 5,9,13-trimethyltetradeca-4,6,12-trien-3-one is heated at 50° for two hours and then poured onto ice cold potassium bicarbonate solution. The reaction is worked up by extraction with ether, washing the ethereal extract, drying over magnesium sulfate and evaporation to yield the formate of 13 - hydroxy - 5,9,13-trimethyl-tetradeca-4,6-dien-3-one.

Using the above process, the formates of Formula A are prepared from the corresponding precursor of Formula B. Alternatively, the formates can be prepared by esterification of the respective hydroxy substituted compound, such as those under Column VIII.

EXAMPLE 8

A mixture of 1 g. of 13-hydroxy-5,9,13-trimethyltetradeca-4,6-dien-3-one, 10 ml. of acetic anhydride and 0.5 g. of dry sodium acetate is refluxed for about five hours. After cooling, excess anhydride is removed by vacuum and the residue extracted with ether. The ethereal extract is washed, dried over magnesium sulfate and evaporated to yield the corresponding acetate, 13-acetoxy-5,9,13-trimethyltetradeca-4,6-dien-3-one.

EXAMPLE 9

A mixture of 2 g. of dry 13-hydroxy-5,9,13-trimethylpentadeca-4,6-dien-3-one, 15 ml. of acetyl chloride and 20 ml. of dry pyridine under nitrogen is heated on a steam bath for about six hours. After cooling, the mixture is concentrated under vacuum and the residue taken up in ether. The ethereal extract is washed, dried over magnesium sulfate and evaporated to yield the corresponding 13-acetate.

The process of this example is repeated with the exception of using triethylamine in place of pyridine to yield the 13-acetate.

By use of the procedure of Example 9, the corresponding 13-chloroacetate, 13-dichloroacetate and 13-trichloroacetate are prepared using chloroacetyl chloride, dichloroacetyl chloride and trichloroacetyl chloride, respectively.

The respective 13-trifluoroacetate, propionate; n-butanoate, n-pentanoate and n-hexanoate esters are prepared according to the process of Example 8 using trifluoroacetic anhydride, propionic anhydride, n-butyric anhydride, n-pentanoic anhydride and n-hexanoic anhydride or according to the process of Example 8 using the corresponding acid chloride.

EXAMPLE 10

One gram of 13-hydroxy-5,9,13-trimethyltetradeca-4,6-dien-3-one in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water. The organic phase is separated and aqueous phase re-extracted with ether. The organic materials are washed with water, dried over sodium sulfate and evaporated to yield the 13-cyclohexyl ether.

EXAMPLE 11

Anhydrous hydrogen chloride is bubbled into 100 ml. of dry carbon tetrachloride at 0° until one equivalent is taken up. Five grams of 5,9,13-trimethyltetradeca-4,6,12-trien-3-one is added and the resulting mixture allowed to stand for about 48 hours at −20°. The mixture is evaporated under reduced pressure to yield 13-chloro-5,9,13-trimethyltetradeca-4,6-dien-3-one which is purified by chromatography.

The above process is repeated using each of the unsaturated compounds under Column VII to prepare the respective chloride under Column X.

X 13-chloro-5,9,13-trimethylpentadeca-4,6-diene-3-one,
13-chloro-5,13-dimethyl-9-ethylpentadeca-4,6-dien-3-one,
12-chloro-4,8,12-trimethyltetradeca-3,5-dien-2-one,
12-chloro-4,8,12-trimethyltrideca-3,5-dien-2-one,
12-chloro-4,12-dimethyl-8-ethyltetradeca-3,4-diene-2-one,
11-chloro-3,7,11-trimethyldodeca-2,4-dien-1-al,
11-chloro-3,7,11-trimethyltrideca-2,4-dien-1-al, and
11-chloro-3,11-dimethyl-7-ethyltrideca-2,4-dien-1-al.

Other mono-substituted di-unsaturated ketones and aldehydes of Formula A can be prepared by the process of this example using a compound of Formula B as the precursor, such as those of Columns I, III and V.

By using each of hydrogen bromide and hydrogen fluoride in the procedure of this example, the respective bromide and fluoride is prepared.

EXAMPLE 12

Chlorine gas is bubbled into 200 ml. of carbon tetrachloride at 0° until one equivalent is taken up. Twenty-five grams of 5,9,13-trimethyltetradeca-4,6,12-trien-3-one is added and the mixture stirred and then allowed to stand at about −20° for 24 hours. The mixture is then evaporated to yield 12,13-dichloro-5,9,13-trimethyltetradeca-4,6-dien-3-one which can be purified by chromatography.

EXAMPLE 13

To a mixture of 5 g. of 5,9,13-trimethyltetradeca-4,6,12-trien-3-one in 100 ml. of fluorotrichloromethane is slowly added one equivalent of anhydrous fluorine at about −78°. After stirring the mixture at this temperature for about 16 hours, the resultant mixture is evaporated and chromatographed on silica to yield 12,13-difluoro-5,9,13-trimethyltetradeca-4,6-dien-3-one.

By using bromine in the process of Example 12, there is prepared 12,13-dibromo-5,9,13-trimethyltetradeca-4,6-dien-3-one.

Other dichloro-, dibromo- and difluoro-substituted ketones and aldehydes of Formula A can be prepared by the procedure of Examples 12 and 13 using a tri-unsaturated compound of Formula B as the precursor, such as those of Columns I, III and V.

What is claimed is:

1. A compound selected from those of the following Formula (A):

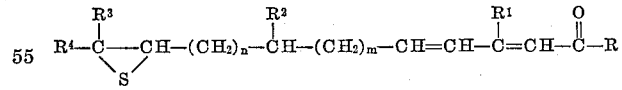

wherein,
R is hydrogen, lower alkyl, cycloalkyl of 4 to 8 carbon atoms, aryl to 6 to 12 carbon atoms or aralkyl of 7 to 12 carbon atoms;
$R^1$ is hydrogen or lower alkyl;
each of $R^2$, $R^3$ and $R^4$ is lower alkyl;
m is zero or the positive integer one, two or three; and
n is the postive integer one, two or three.

2. A compound according to claim 1 wherein $R^1$ is hydrogen or methyl.

3. A compound according to claim 2 wherein each of $R^2$, $R^3$ and $R^4$ is methyl or ethyl and R is hydrogen or lower alkyl.

4. A compound according to claim 3 wherein m is zero or one, n is one or two and R is hydrogen, methyl or ethyl.

5. A compound according to claim 4 wherein $R^1$ is methyl.

6. A compound according to claim 5 wherein $m$ is one and $n$ is two.

7. A compound according to claim 4 wherein $R^1$ is hydrogen.

8. A compound according to claim 7 wherein $m$ is one and $n$ is two.

9. A compound according to claim 6 wherein each of $R^2$ and $R^3$ is methyl.

10. The compound, 12,13-epithio-5,9,13-trimethyltetradeca-4,6-dien-3-one, according to claim 1.

References Cited

Barton, et al., Chem. Abs. 54:9982–3 (June 1960).

HENRY R. JILES, Primary Examiner

C. M. S. JAISLE, Assistant Examiner

U.S. Cl. X.R.

260—240 H, 348 R, 405.5, 409, 410.9 N, 468 R, 471 R, 592, 593 H, 594, 599, 601 H, 602; 424—275, 278, 305, 308, 309, 311, 312, 314, 331, 333